Patented May 10, 1927.

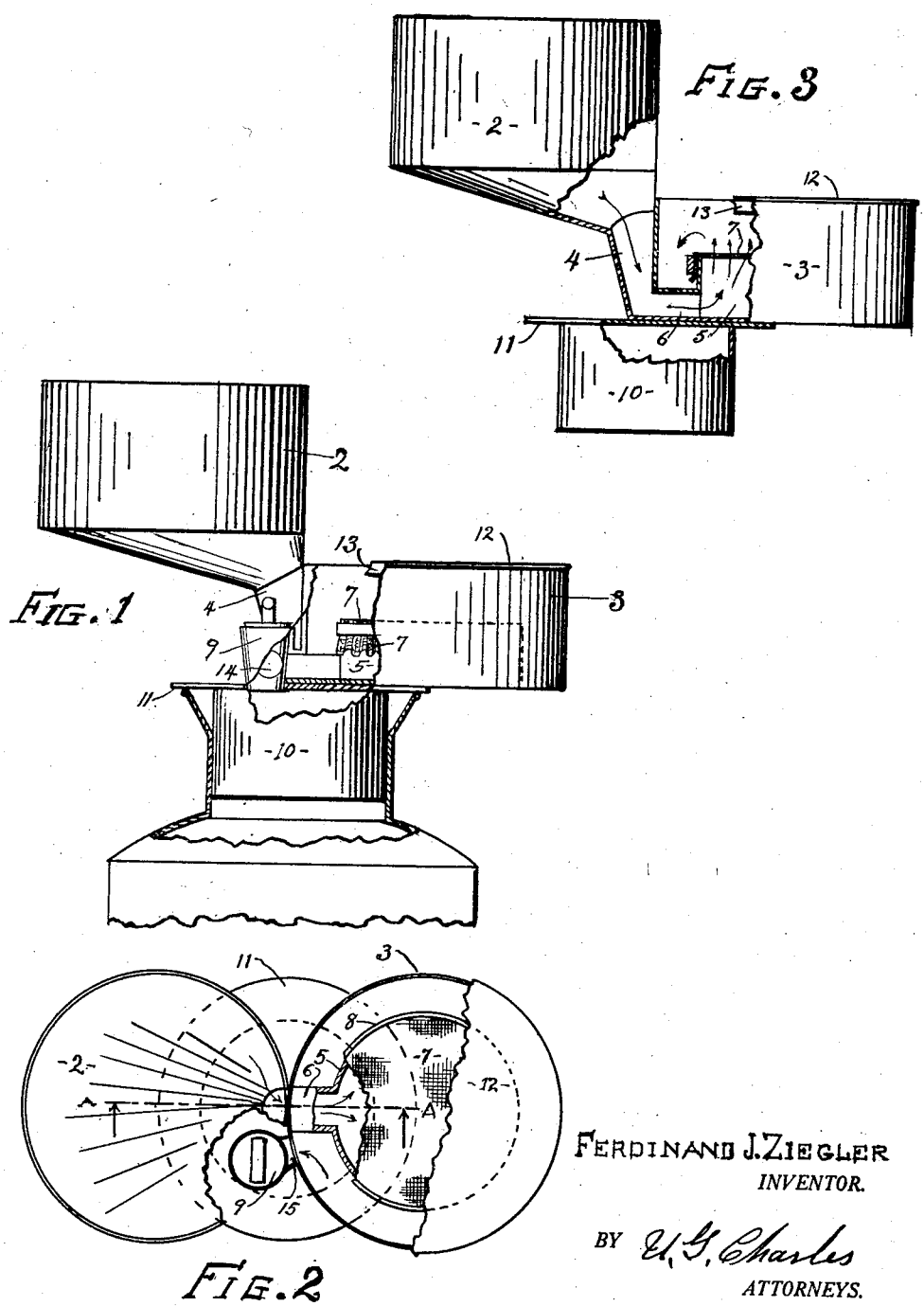

1,628,021

UNITED STATES PATENT OFFICE.

FERDINAND J. ZIEGLER, OF TOPEKA, KANSAS.

MILK STRAINER.

Application filed December 26, 1925. Serial No. 77,737.

My invention relates to strainers, and has for its chief object a mechanism that will cause the milk to flow upward through the strainer allowing the dregs to settle in the opposite direction, thereby obviating the collection thereof on the strainer and gradually washing it through.

A further object of my invention is to provide a strainer that will seal the top of the milk can while the device is in operation.

A still further object of my invention is to provide a strainer having a valve to control the flow of the milk as it enters the milk can.

These and other objects will hereinafter be more fully explained.

Referring to the drawings:

Fig. 1 is a side elevation, parts removed for convenience of illustration.

Fig. 2 is a plan view.

Fig. 3 is a side view partly in section, taken on line AA in Fig. 2 looking in the direction of the arrows.

In Fig. 1, 1 is a fragmentary part of a milk can showing the supporting means placed within the neck functioning as a spout, 2 is a container functioning as a funnel, and connected to a reservoir 3 by means of a spout 4, the said spout communicating with an overflow chamber 5 by means of a duct 6, the said chamber being concentrically positioned within said reservoir and securely soldered thereto; on the top of said chamber is positioned a strainer 7, said strainer being of fabric or finely woven metal gauzing and is firmly bound over the top of the chamber by means of a ring 8.

Positioned at one side of the reservoir and communicating therewith is a valve 9, the said valve adapted to discharge the contents of the reservoir through a spout 10. The said spout fitting closely in the neck of the milk can, and vertically supported therewith by a flange 11 resting on the flaring part thereof, the said flange being the peripheral portion of a disc covering the end of the spout adjacent to the reservoir and soldered firmly thereto.

It will be understood that the funnel, reservoir, and spout are attached firmly together and function as a milk strainer unit. The reservoir has a close fitting lid 12, the flange of which engages on the inside thereof as at 13, the said lid and the flange 11 function as inclosures for sanitary purpose while the milk is being strained and conveyed into the milk can.

To operate the strainer, I place it on the can as shown in Fig. 1, the milk is then poured in the funnel and conveyed to the elevation chamber 5, and by reason of the elevation of the milk in the funnel it is forced upward through the gauzing into the reservoir and through the valve into the milk can. The dregs separated by the straining process are inclined to settle to the bottom of the chamber 5 rather than to be supported by the strainer as was the former custom, therefore the possibility of the dregs washing through the strainer is eliminated to a great extent, and furthermore the efficiency of the strainer while separating the dregs from the milk is better maintained. In other words the strainer will not become clogged during the straining process, as was formerly experienced by forcing the milk through the opposite way.

Should the can become filled before the reservoir is emptied, the flow of the milk is stopped by turning the valve so that the aperture 14 will disengage from the opening through the neck 15 as shown in Fig. 1 closing the valve at which time the strainer may be placed on another can, the valve then being opened and the process repeated.

Note in the drawings that the direction of the flow of milk is indicated by the arrows.

I do not confine the mechanism to the purpose of straining milk as other fluids may be advantageously strained.

Such modifications may be employed as lie within the scope of the appended claims.

Having thus described my invention, what I claim as new and desire to secure by Letters Patent is:—

1. In a milk strainer, a flanged spout having a reservoir connected thereto and extending to one side so that one side of the wall is in vertical alignment with the axis of the spout, a funnel positioned above the reservoir having a spout in vertical alignment with one side thereof as connecting means for said funnel and reservoir and being so connected and extending in opposite directions to counter-balance on the diametrical axis of the spout, an annular wall concentrically positioned within the reservoir, the top thereof being spaced from the top of the reservoir, a woven fabric strainer to cover the top of said annular wall and held firmly thereto by a removable ring, a duct connecting the spout with the bottom of the annular wall, a rotary valve positioned on the flanged spout adjacent the reservoir and connected thereto by a hollow necked member, the said valve communicating with the flanged spout, all as, and for the purpose described.

2. In a milk strainer, a flanged spout to engage in the neck of a milk can, the flange to function as a closing means for the neck and a bearing means for the strainer, an annular reservoir connected to the spout with the side intersecting the diametrical axis thereof, a strainer concentrically positioned in the reservoir, the top being spaced below the top thereof, a rotary valve vertically positioned on the flanged spout, a neck connecting the valve with the reservoir as discharging means therefrom into the milk can, an annular funnel having a spout to discharge at one side thereof, the spout being rigidly connected to the side of the reservoir as supporting means for the funnel thereabove, the aligned intersection of the sides of the funnel and reservoir being centralized on the top of the flanged spout.

FERDINAND J. ZIEGLER.